United States Patent [19]
Jakubek et al.

[11] 3,852,193
[45] Dec. 3, 1974

[54] LIQUID-PURIFYING PROCESS AND APPARATUS

[75] Inventors: Peter Jakubek, Gebirge; Karl Biswanger, Wien, both of Austria

[73] Assignee: Firma Research Filter- und Patentforschungs-Ges.m.b.H., Wien, Austria

[22] Filed: Mar. 16, 1973

[21] Appl. No.: 342,252

[30] Foreign Application Priority Data
Mar. 20, 1972 Austria .............................. 52349/72

[52] U.S. Cl. ...................... 210/73, 210/83, 210/104, 210/110, 210/265, 210/290, 210/DIG. 21
[51] Int. Cl. ...................... B01d 21/24, B01d 23/26
[58] Field of Search ........... 210/40, 73, 82, 86, 104, 210/108, 121, 136, 188, 257, 258, 277, 283, 284, 290, DIG. 21, 83, 110, 265, DIG. 5

[56] References Cited
UNITED STATES PATENTS
227,954   5/1880   Buss .................................. 210/284
2,330,508  9/1943  McColl ...................... 210/DIG. 21
2,609,099  9/1952  Griswold ...................... 210/DIG. 5
3,617,566  11/1971  Oshima et al. ...................... 210/40
3,627,131  12/1971  Goodman et al. ..................... 210/82

FOREIGN PATENTS OR APPLICATIONS
9,606   6/1898   Great Britain ...................... 210/137

Primary Examiner—Roy Lake
Assistant Examiner—Craig R. Feinberg
Attorney, Agent, or Firm—Ernest G. Montague; Karl F. Ross; Herbert Dubno

[57] ABSTRACT

A process for purifying a polluted liquid which contains a liquid impurity having a lower specific gravity than the polluted liquid, in which the polluted liquid is intermittently sucked from an antechamber into a filter. Filtered liquid is intermittently sucked from said filter and is discharged under pressure through an equalizing container. The intermittent sucking and discharge of said liquid are controlled in dependence on the liquid level in said antechamber.

34 Claims, 11 Drawing Figures

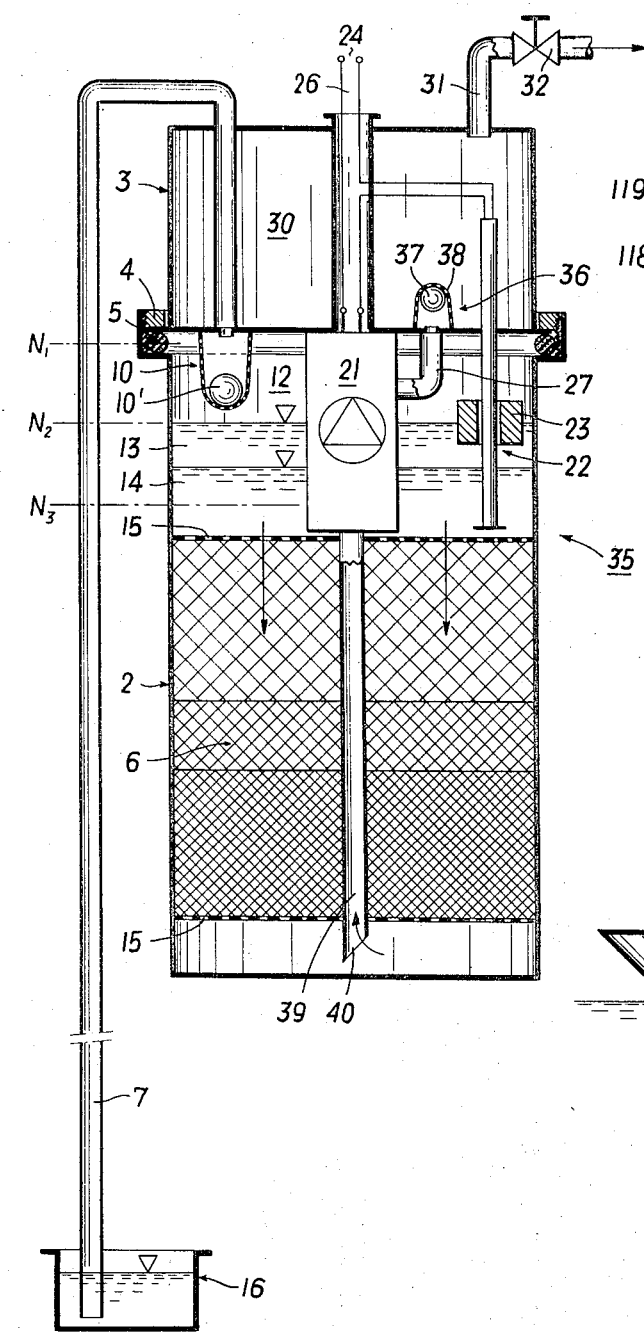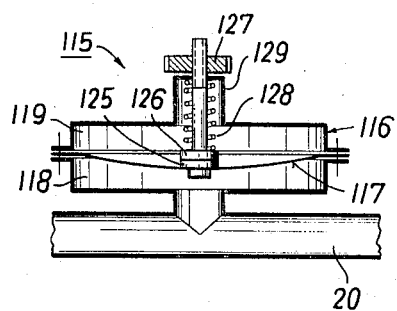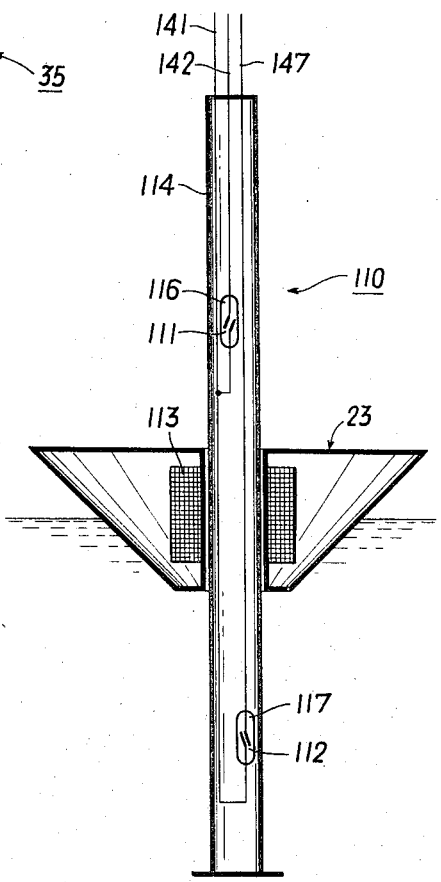

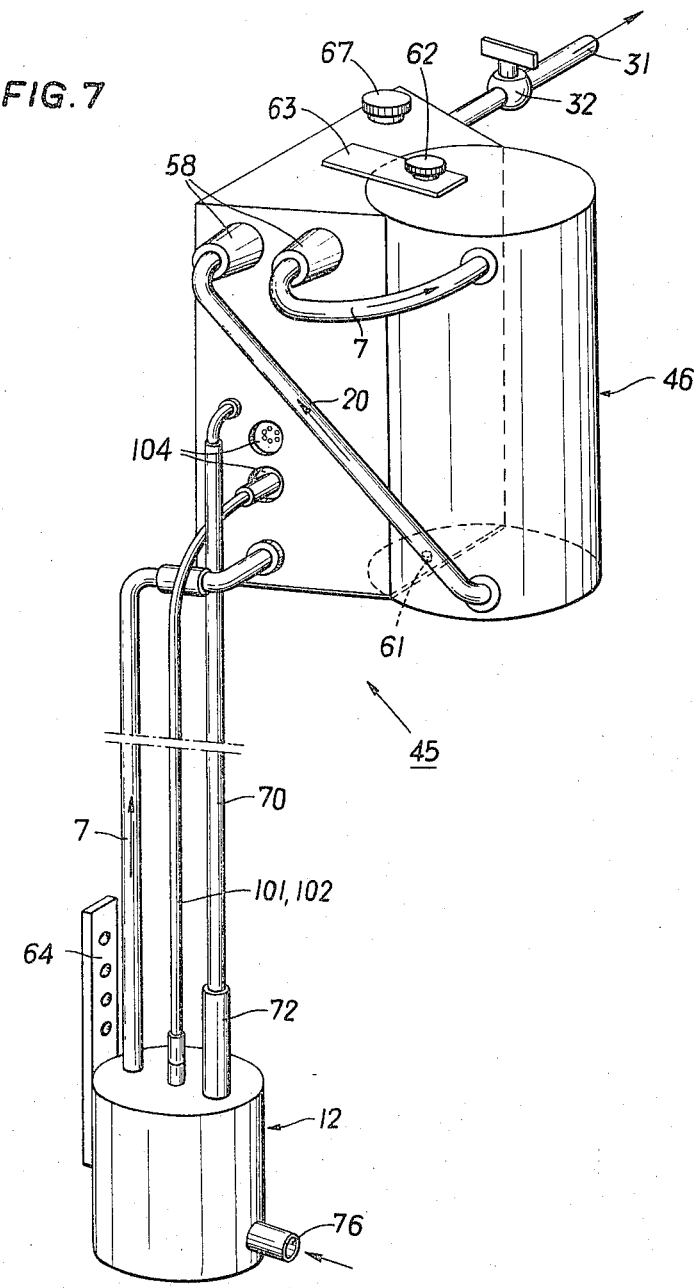

LIQUID-PURIFYING PROCESS AND APPARATUS

The present invention relates to a process for purifying liquids which are polluted with liquids having a lower specific gravity, particularly for purifying oil-polluted water, and to apparatus for carrying out the process.

Various problems are involved in the purification of liquids which are polluted with oil or the like. The purification of polluted water is important for the protection of the environment, particularly of waters. A purification of water which has been contaminated with oil or the like is required, for instance, after an accident in which tankers are involved, and in connection with bilge-pumping and tank-flushing operations. Because suitable processes and apparatus were not available, the previous practice has been simply to pump contaminated water overboard. This has resulted in considerable pollution of waters.

The previously known apparatus for purifying liquids which are polluted with oil or the like have numerous disadvantages. The polluted liquid has been pumped through a filter in which the liquid was to be purified. Where such apparatus was used, the liquid handled in the pump was still polluted with oil or the like so that an emulsion was formed and the increased viscosity of the liquid to be handled required a higher pump power. Mechanical impurities contained in the liquid often resulted in trouble in the operation of the conventional apparatus.

It is an object of the present invention to provide a process of purifying liquids which are polluted with oil or the like, and apparatus for carrying out the process, which process and apparatus are free of the above-mentioned disadvantages and ensure an economical and thorough purification of the polluted liquid. It is also an object to provide a process capable, in an economical manner, of the purification of liquids at low rates, such as are to be handled during the bilge-pumping of sports boats, as well as of the purification of liquids at very high rates, for instance, in connection with the flushing of a tank and after accidents involving a tanker.

This object is essentially accomplished according to the invention in that the polluted liquid is intermittently sucked from an antechamber through a filter and the liquid which has thus been filtered is discharged under pressure through an equalizing chamber, which follows the filter. The intermittent sucking and discharge of the liquid is controlled in dependence on the liquid level in the antechamber. In the process according to the invention, an emulsion cannot be formed even where inexpensive and robust centrifugal pumps are used because the oil or the like is removed from the liquid ahead of the pump. Also, no trouble can arise in the operation of the pump because the filter precedes the pump. These advantages are accompanied by a higher purity of the liquid which is discharged from the equalizing chamber, and a pump of lower power is sufficient because the purified liquid has a lower viscosity than the liquid which is polluted with oil or the like.

In accordance with the invention, the efficiency of the process may be increased in that the liquid flows through a separating chamber, which precedes the filter and in which oil or the like and liquid are pre-separated and the major part of the liquid impurity is removed.

In a modification of the process, the transfer of liquid from the separating chamber into the filter is interrupted when the layer of oil or the like in the separating chamber has increased to a predetermined thickness. Where this feature of the process is adopted, the main amount of the separated oil is retained in the separating chamber so that the life of the actual filter is substantially increased. To protect the means for handling the liquid, a further feature of the invention provides in that the supply of polluted liquid is interrupted when the transfer of liquid from the separating chamber into the filter is interrupted.

The apparatus for carrying out the process according to the invention comprises a liquid pump connected between the filter and equalizing chamber. The filter is connected to the suction side and the equalizing chamber is connected to the discharge side of said pump, and the antechamber which precedes the filter contains a switch which serves to control the pump and which is operated in dependence on the liquid level in the antechamber. In accordance with the invention, it is desirable to use a float-controlled magnetic switch, which de-energizes the pump when the liquid subsides below a predetermined level.

In one embodiment, the filter is preceded by a separating chamber and the liquid from the separating chamber flows through the filter from top to bottom. A particularly good purification is achieved because the liquid to be purified flows through the filter from top to bottom.

To prevent an ingress of oil which has been collected in the separating chamber into the filter, a feature of the invention provides that a float valve having a densimetric float, which floats on the liquid and below the oil layer in the separating chamber, is connected between the filter and separating chamber. Particularly where a centrifugal pump is used, the rate at which liquid flows through the apparatus may be adjusted in a simple manner if, in accordance with a feature of the invention, an adjustable throttle valve is incorporated in the conduit for discharging purified liquid from the equalizing chamber.

An embodiment of the apparatus according to the present invention is particularly intended for the purification of liquid at low rates, such as are to be handled, for instance, in connection with the bilge-pumping of sports boats or small ships, and is characterized in that the filter and the separating chamber are accommodated in a common housing, the separating chamber serves also as an antechamber, and the equalizing chamber is disposed above the separating chamber. In such an arrangement, the equalizing chamber may be desirably accommodated in the cover of the housing.

According to the invention, the volume of the equalizing chamber is at least as large as the volume of the antechamber. When air is being handled, the liquid level in the antechamber is lowered, and the pump is de-energized when the liquid subsides below a predetermined level. If the pump consists of a centrifugal pump, liquid will then flow back from the equalizing chamber into the antechamber so that the filter is automatically cleaned. This arrangement ensures that the filter is constantly covered by liquid and This condition contributes to a good separation of oil or the like and liquid.

To avoid as far as possible an emptying of the antechamber through the intake conduit and a handling of air, the intake conduit for sucking polluted liquid into the antechamber incorporates a check valve and the free end of the intake conduit opens at the point where polluted liquid is taken and is adapted to be closed by means of a float-controlled shut-off valve.

In an embodiment which is particularly space-saving and in which the exchange of the filter is facilitated, the pump is disposed within the housing and with the exception of the filter all components, such as the pump, the intake conduit which opens in the antechamber, the float-controlled magnetic switch, the electric conduits and a conduit leading from the pump to the equalizing chamber etc. are carried by the cover. In this embodiment, the filter can be exchanged together with the housing which contains the filter so that a quick exchange is enabled.

Another embodiment of the apparatus according to the invention can be designed particularly for high liquid flow rates and is characterized in that a unit is provided which comprises the antechamber, another unit is provided which comprises the filter and the separating chamber, and an additional unit is provided which comprises the pump and the equalizing chamber. The unit which comprises the filter and the separating chamber is preferably carried by the unit which comprises the pump and the filter unit and can be separated from the latter when the filter is to be exchanged. The exchange of the filter will be further facilitated if the connecting conduits are connected by quick couplings and a chamber for collecting any air contained in the connecting conduits is provided between the filter and pump.

If the antechamber is provided with an air supply conduit which is open when the apparatus is inoperative, said conduit may be disposed immediately over the bottom of the chamber in which the polluted liquid is collected and said conduit will be automatically filled with liquid. When the apparatus is put into operation, the air supply conduit must be closed. For this purpose, the air supply conduit is adapted to be closed by a solenoid valve or by a valve which is operated in response to a vacuum between the filter and pump.

The apparatus may also be characterized in that the intake pipe for supplying polluted liquid into the antechamber opens in the latter close to the top of said antechamber and opens outside of the antechamber near the bottom. This arrangement ensures that the antechamber will not be filled unless the liquid has reached a certain level and that the chamber which contains the polluted liquid can be completely emptied. In a desirable development, the float-controlled magnetic switch may be arranged to energize the pump when the liquid in the antechamber has risen above a predetermined level.

A flow of liquid from the filter into the antechamber when the apparatus is inoperative is prevented in that a check valve is provided in the conduit which connects the antechamber and separating chamber.

To prevent an evaporation of liquid from the apparatus and to ensure that the apparatus will be continuously ready to operate even after a prolonged shutdown and particularly in case of high ambient temperatures, a feature of the invention resides in that the outlet opening for discharging purified liquid from the equalizing chamber is provided with a vapor lock.

The vapor lock preferably comprises a chamber, into which the discharge conduit opens and which is connected to the equalizing chamber through a first check valve which opens in the direction in which the liquid is discharged and a second check valve which opens in the opposite direction.

According to another feature, the equalizing chamber may be defined by an expandable hollow body, which has an outlet opening that is adapted to be closed by a check valve which opens in the direction in which liquid is discharged. A particularly desirable utilization of the entire filter will be ensured if, in accordance with the invention, the filter is held between perforated plates and the perforations in the upper perforated plate decrease in size and/or increase in pitch toward the center of said perforated plate and, the conduit which connects the filter container and pump opens approximately at the center of the bottom of the filter container.

To ensure a particularly good preseparation of oil or the like and liquid, the apparatus may be characterized in that a layer of coarse-pored foamed material carried between perforated plates is disposed in the upper portion of the separating chamber to reduce turbulence.

A continued operation of the pump when this is not required after the transfer of liquid from the separating chamber into the filter has been interrupted will be avoided if the conduit connecting the filter and pump incorporates a switch which controls the pump and opens in response to a predetermined vacuum.

According to a further feature of the apparatus according to the invention, the separating chamber contains a float-controlled, two-position magnetic switch which causes an oil drain connected to the separating chamber to be opened and the direction in which the liquid is handled to be reversed when the layer of oil or the like has reached a predetermined thickness so that oil or the like is then forced out of the separating chamber, whereafter the magnetic float switch initiates the closing of the oil drain and another reversal of the direction in which the liquid is handled, so that the purification of the liquid is resumed. This embodiment will be particularly advantageous if the liquid contains a particularly high proportion of oil or the like.

The filters used within the scope of the invention consist preferably of a layer of balls or the like. The balls may consist of materials which adsorb oil or the like, and polytetrafluoroethylene is particularly desirable for this purpose. The filters can easily be exchanged if the balls or the like are held in a net of a material which is inert to the liquid and the oil or the like. A particularly good filter action will be provided if, in accordance with the invention, there are a plurality of layers of balls and the ball diameter decreases in the direction in which the layer flows through the filter.

The invention will be explained more fully with reference to the accompanying drawing, in which:

FIG. 2 is a vertical section which shows a modification of the apparatus according to FIG. 1 with an internally disposed pump;

FIG. 7 is a perspective view showing the apparatus of FIG. 3;

FIG. 10 shows, in vertical section, a vacuum switch and

FIG. 11 shows, in vertical section, a two-position magnetic switch.

Figure 1:
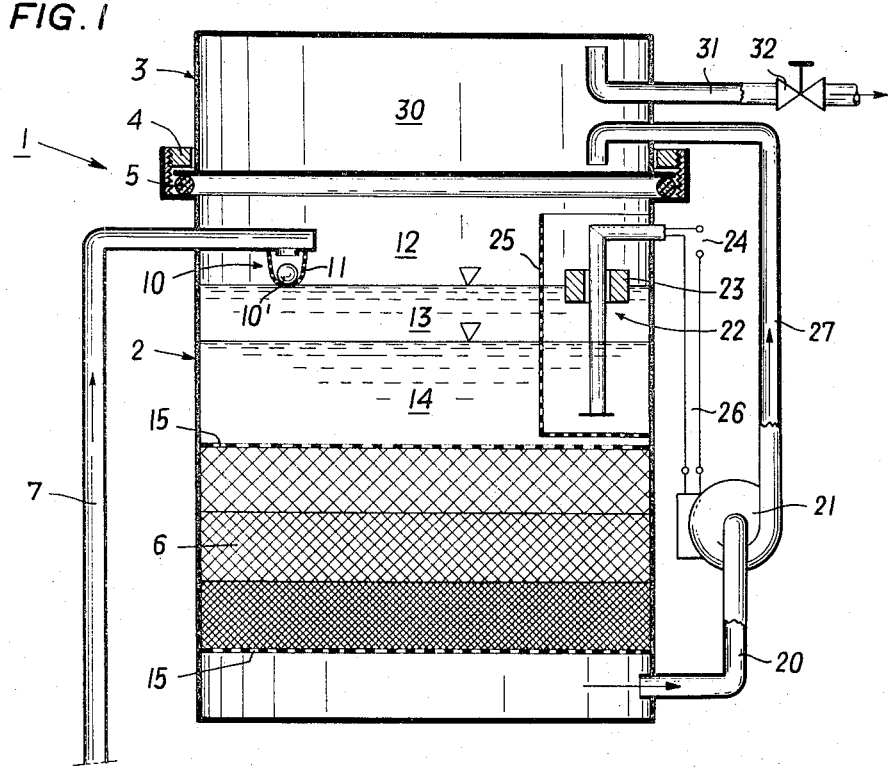
FIG. 1 is a vertical section which shows an apparatus according to the invention comprising an externally disposed pump.

Whereas the apparatus which are shown in the drawings and will be described more fully hereinafter are intended to purify bilge water which is polluted with oil or the like, it is emphasized that the invention is by no means restricted to the purification of bilge water.

The apparatus 1 shown in FIG. 1 comprises a housing 2 and a cover 3. The cover 3 is connected by a screw-threaded ring 4 to the housing 2. A sealing ring 5 is inserted between the cover 3 and housing 2.

A filter 6 is disposed between perforated plates 15 in the housing 2. The filter consists of three layers of open-pore foam. The size of the pores in the layer decreases from top to bottom, in the direction in which the liquid flows through the filter 6. The filter material may basically consist of any plastic material which adsorbs oil. Such materials include plastic materials based on polyesters which are cross-linked with isocyanates, diamines or glycols, or on polyesters, polyurethanes, polyisocyanates, as wel as polytetrafluoroethylene. Above the filter 6, the housing 2 contains an antechamber 12 which; in this embodiment, serves also as a separating chamber. An intake conduit 7 opens into the antechamber 12. The other end of the intake conduit 7 opens at a bilge 16 and is provided with a suction head 8, which can be shut off by a ball valve. A valve ball 9 of the ball valve is held in a wire cage 11 and closes the suction head 8 when the bilge 16 is about to be emptied. When the bilge 16 contains a sufficient amount of water which is polluted with oil or the like, the valve ball 9 will float up to unblock the opening in the suction head 8. That end of the intake conduit 7 which opens in the antechamber is provided with a check valve 10. The check valve 10 comprises a valve ball 10', which is held in a wire cage 11. The check valve 10 prevents a flow of liquid from the antechamber 12 through the conduit 7, for instance, when the apparatus 1 is inclined as a result of a rolling motion of the boat. The check valve 10 also prevents evaporation of water from the antechamber 12.

The antechamber 12 also contains a float-controlled magnetic switch 22, which comprises a float 23 which floats on an oil layer 13, which is superimposed on the water layer 14. The float-controlled magnetic switch 22 is surrounded by a grid 25 which prevents damage to the float-controlled magnetic switch 22 during an exchange of the filter 6 and which damps fluctuations of the liquid level in the antechamber.

A connecting conduit 20 which connects the housing 2 and a centrifugal pump 21 opens between the lower perforated plate 15 and the bottom of the housing 2. The water from which oil or the like and mechanical contaminants have been removed is discharged by the centrifugal pump 21 through an additional connecting conduit 27 into an equalizing chamber 30, which is provided in the cover 3. From the equalizing chamber 30, purified water flows out of the apparatus through a discharge conduit 31, which may lead, overboard. The discharge conduit 31 comprises a throttle valve 32 for adjusting the rate at which liquid is handled by the apparatus.

When the bilge 16 is almost empty, some air is supplied into the antechamber 12 before the valve ball 9 finally closes the suction head 8. As a result, the liquid level in the antechamber 12 will gradually subside. When the liquid in the antechamber 12 has subsided below a predetermined level, the float-controlled magnetic switch 22 responds to interrupt the supply of current from a current source 24 through electric leads 26 to the motor of the centrifugal pump 21. This may be accomplished, by a relay, not shown. When the centrifugal pump 21 has been de-energized, the equalizing chamber 30 is emptied through the conduit 27, the centrifugal pump 21, and the conduit 20 into the interior of the housing 2. The water which flows back through the filter 6 into the antechamber 12 entrains loosely held oil droplets from the filter so that the filter is automatically cleaned. At the same time, the float-controlled magnetic switch 22 in conjunction with the equalizing chamber 30 ensures that the filter 6 and the centrifugal pump 21 are always filled with water and the apparatus 1 always remains ready for operation, even if the valve ball 9 at the suction head 8 does not operate properly and much air enters the antechamber 12.

To minimize the overall height of the apparatus 1, the conduits 27 and 31 opening into the equalizing chamber have ends which are turned down and up, respectively so that the volume which is available in the cover 3 is fully utilized. The volume of the equalizing chamber must be at least as large as the effective volume of the antechamber 12. The effective volume of the antechamber 12 is determined by the uppermost and lowermost liquid levels in the antechamber 12, which levels are respectively determined by the check valve 10 and the float-controlled magnetic switch 22.

The apparatus 35 shown in FIG. 2 has basically the same design as the apparatus 1 of FIG. 1. A difference resides in that in the embodiment of FIG. 2 the pump is disposed inside the housing 2. In this embodiment, all conduits extend through the cover 3, and the pump 21, the float-controlled magnetic switch 22 and the upper perforated plate 15 as well as a suction pipe of the pump are carried by the cover. The suction pipe of the pump extends through the filter 6 and terminates below the lower perforated plate 15. In the apparatus 35, the filters 6 may be exchanged in a particularly and quick operation. It is sufficient to loosen the screw-threaded ring 4, to pull down the housing 2 containing the filter 6 and to replace a new filter with its housing. Because the suction pipe 39 has a pointed lower end portion 40, a bore for receiving the suction pipe 39 need not be provided in the filter 6, which is simply pierced by the suction pipe 39. This ensures also a snug contact between the filter 6 and the suction pipe 39. The apparatus 35 has the same mode of operation as the apparatus 1. When air enters through the intake conduit 7 and the liquid in the antechamber 12 subsides below a predetermined level, the float-controlled magnetic switch 22 de-energizes the centrifugal pump 21 whereafter the equalizing chamber is emptied through the conduit 27, the centrifugal pump 21, the suction pipe 39 and the filter into the antechamber 12. An emptying of the antechamber 12 through the intake conduit 7 is prevented also in the apparatus 35 by the check valve 10. Because the filter 6 and the centrifugal pump 21 are always filled with water, the apparatus 35 is always ready for operation. In order to prevent an evaporation of water from the apparatus even after a prolonged shutdown thereof and in the case of high ambient temperatures, a vapor trap or lock 36 is provided at that end of the connecting conduit 27 which opens into the equalizing chamber 30. The trap or lock 36 comprises a valve ball 37, which is movable in a grid cage 38 and which is trimmed so that the ball just floats in the water in the equalizing chamber 30. Because the valve ball 37 just floats in the water, the ball does not prevent a flow out of the equalizing chamber 30 through the conduit 27. During the operation of the apparatus, this flow is promoted by the vacuum which prevails in the antechamber 12 over the liquid. When the equalizing chamber 30 has been completely emptied, the valve ball 37 is seated on the opening of the connecting conduit 27 and prevents an evaporation of the water which is contained in the container 2 and the centrifugal pump 21.

Before the apparatus 35 is put into operation, it is filled with water to the level N1 in the antechamber 12. When polluted water is sucked from the bilge 16, air first flows from the intake conduit 7 into the antechamber 12 so that the liquid assumes the level N2 therein. This is the normal liquid level during the operation of the apparatus 35. When the handling of water from the bilge 16 is almost terminated and air is sucked, the liquid level subsides and the magnetic switch 22 deenergized the centrifugal pump 21 when the liquid has reached the level N3. When the centrifugal pump 21 has been deenergized, water flows from the equalizing chamber 30 into the antechamber 12 and the liquid in the latter rises to the level N1, as has been mentioned above. For this reason, the volume of the equalizing chamber is at least as large as the effective volume of the antechamber 12 between the levels N1 and N3.

Figure 3:
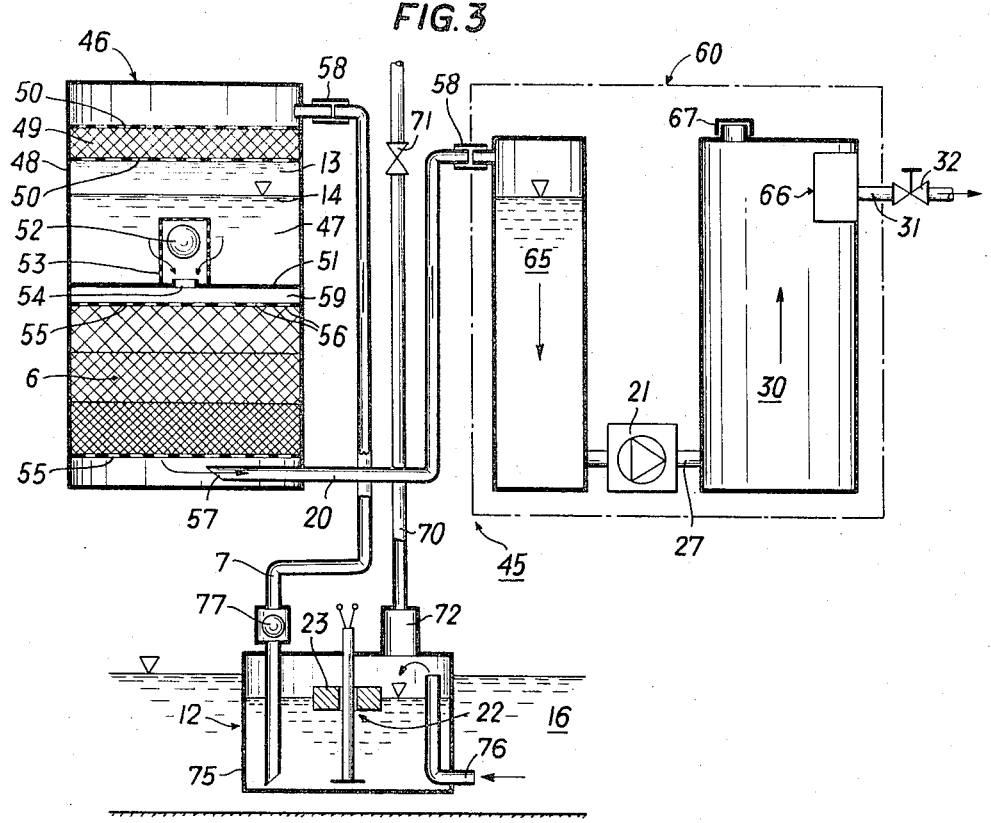
FIG. 3 is a vertical section which shows a further embodiment of the apparatus according to the invention.

The apparatus 45 which is diagrammatically shown in FIG. 3 and serves to purify bilge water which is polluted with oil or the like comprises three units, namely, the antechamber 12, a unit 46 comprising a separating chamber 47 and the filter 6, and a unit 60 which comprises a chamber 65, the pump 21 and the equalizing chamber 30. Because the unit 46 comprising the filter 6 can easily be exchanged, the apparatus 45 can be adapted in a simple manner to different operating conditions, such as different rates of oil or water to be handled. The antechamber 12 is arranged in the bilge 16 and is connected to the unit 46 by the suction conduit 7, which incorporates a check valve 77 and is connected to the unit 46 by a quick coupling 58 so that a quick disconnection and connection are ensured. The antechamber 12 can be vented through a venting conduit 70, which is adapted to be closed by a shut-off valve 71, which is open when the apparatus 45 is inoperative. The opening 72 of the venting conduit 70 in the antechamber 12 is enlarged in diameter in order to prevent a clogging of said conduit by oil or the like which may be splashed up. The antechamber 12 is connected to the bilge 16 by an inlet pipe 76, which extends pressure-tightly through the antechamber housing 75. The outer opening of the inlet pipe 76 may be provided with a filter and is disposed slightly over the bottom of the housing 75. The inlet pipe 76 extends upwardly in the antechamber 12 and opens slightly below the upper end of the housing 75. The float-controlled magnetic switch 22 provided with the float 23 is also incorporated in the housing 75.

The unit 46 comprises a housing 48, which in its upper portion accommodates the separating chamber 47 and in its lower portion accommodates the filter 6. The separating chamber 47 is closed at its top by a damping layer 49, which consists, e.g., of coarse-pored foamed material. The damping layer 49 is disposed between perforated plates 50. The upper perforated plate 50 is spaced from the top of the housing 48. The suction conduit 7 opens in the container 48 in the space between the perforated plate 50 and the top of the housing 48. The separating chamber 47 contains an upper oil layer 13 and a lower water layer 14 and is separated by a partition 51 from the space 59 which accommodates the filter 6. Liquid flows from the separating chamber 47 into the space 59 through an opening 54 which is provided in the partition 51. The opening 54 has associated with it a shut-off valve consisting of a densimetric valve ball, which is guided in a cage 53. The densimetric valve ball 52 is trimmed to float on water and to sink in oil so that the valve ball 52 subsides with the interface between oil 13 and water 14 and closes the opening 54 when the oil layer 13 fills the separating space 47 so far as to the partition 51.

The filter 6 in the space 59 is carried between two perforated plates 55. In the perforated plates 55, the size of the holes 56 decreases and their pitch increases from the edge to the center. This ensures a uniform flow through the filter although water can flow only through the opening 54 from the separating chamber into the filter space 59. For the same reason, the opening 57 of the connecting conduit 20 is disposed approximately at the center of the lower perforated plate 55. As is indicated in the drawing, the filter 6 consists of three layers having porosities which decrease from top to bottom. The filter materials may be used which have been mentioned in connection with the apparatus 1 and 35.

Figure 4:
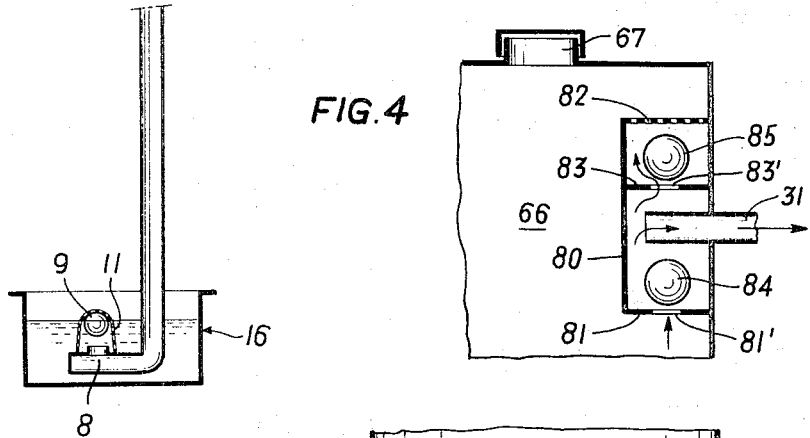
FIG. 4 is a section detail view which shows a vapor lock.

As has been mentioned, the third unit comprises the centrifugal pump 21, the equalizing chamber 30 and another chamber 65, which is disposed between the unit 46 and the pump 21. In this case too, the conduit 20 from the unit 46 is connected to the unit 60 by a quick coupling 58. The chamber 65 serves to collect air which during an exchange of the filter has entered the connecting conduits. When air enters the centrifugal pump 21, the discharge of water through the apparatus will be interrupted. The equalizing chamber 30 is connected to the centrifugal pump 21 by the connecting conduit 27 and has at its top a filling opening 67, which can be shut off, and a vapor lock 66, which precedes the discharge conduit 31 for purified water. An adjustable throttle valve 32 is again accommodated in the discharge conduit 31. The design of the vapor lock 66 is shown more fully in FIG. 4. The vapor lock 66 comprises a cylindrical housing 80 which has a bottom 81, a grid 82 at its top, and a partition 83. The bottom 81 has a hole 81' and the partition has a hole 83'. These holes can be closed by ball valves 84 and 85, respectively. The discharge conduit 31 opens in the cylindrical housing between the bottom 81 and the partition 83. The valve ball 84 is a steel ball. The valve ball 85 is made of plastic material. The vapor lock 66 operates as follows: During a normal operation of the apparatus 45, water flows from the equalizing chamber 30 through the opening 81' and lifts the valve ball 84 and is discharged through the conduit 31. When the handling of water is interrupted, the vacuum in the unit 46 and the chamber 65 is eliminated in that air and/or water is sucked through the antechamber 30. Air and/or water then flow through the vapor lock 66 and lift the valve ball 85 and flow into the equalizing chamber 30. If an evaporation of water results in a superatmospheric pressure in the apparatus 45, particularly in the equalizing chamber 30, the valve ball 85 will be forced against the opening 83' and no water vapor can escape from the equalizing chamber 30. Only under much higher pressures is the valve ball 84 of steel lifted so that this valve ball acts as a relief valve. Hence, the vapor lock 66 ensures that the apparatus 45 is always ready for operation because water cannot evaporate from the same.

Figure 5:
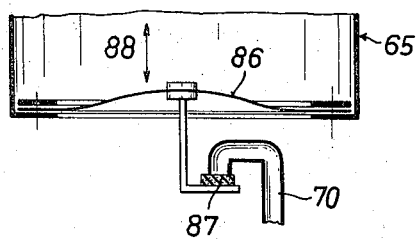
FIG. 5 is a sectional detail view which shows a pressure-responsive valve.

The shut-off valve 71 in the venting conduit 70 may be a solenoid valve which is connected to close the venting conduit 70 when the drive motor of the centrifugal pump 21 is energized. Alternatively, the shut-off valve 71 may be controlled by the vacuum in the apparatus 45. Such an arrangement is shown in FIG. 5. A diaphragm to which a valve member is secured is gripped in the bottom of the chamber 65. When the vacuum in the chamber 65 increases during the operation of the apparatus 45, the diaphragm 86 is deflected in the direction of the arrow 88 and the valve member 87 is forced onto the opening of the venting conduit 70. A tight seal of the valve member 87 is assisted by the vacuum in the conduit 70.

Figure 6:
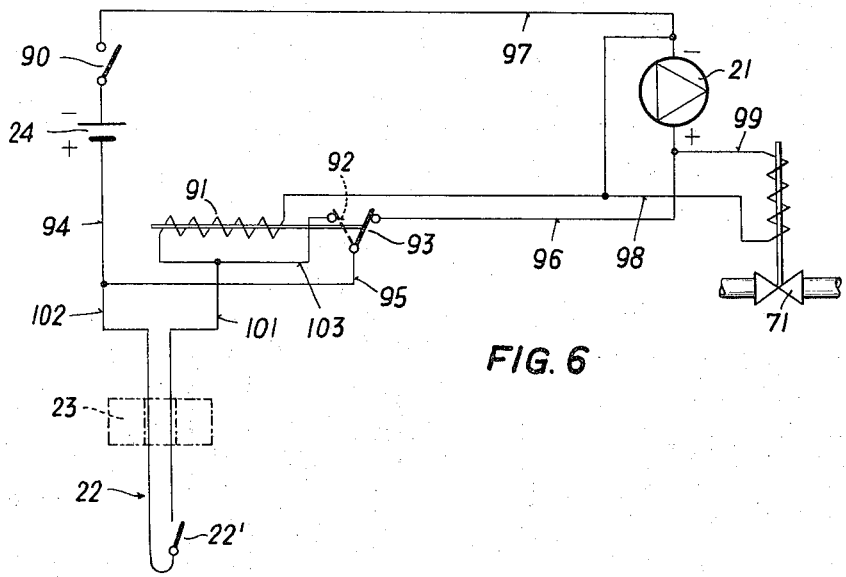
FIG. 6 shows a circuit diagram of the electric components of the apparatus according to FIG. 3.

FIG. 6 shows a circuit diagram of the electric components of the apparatus 45. The electric components comprise essentially a source of current 24, a master switch 90, the float-controlled magnetic switch 22, and a relay 91. When the relay 91 is de-energized, its switch is in position 93. Unless the float 23 is adjacent to the contacts 22' of the float-controlled magnetic switch 22, the contacts are open and the relay remains deenergized. When the master switch 90 is now closed, the motor of the pump 21 is connected to the source of current 24 by the leads 97 and 94, 95, 96. At the same time, current flows through the leads 98 and 99 and the solenoid of the shut-off valve 71, which solenoid is connected in shunt to the motor of the pump 21. As a result, the valve 71 is closed. When the liquid level in the antechamber 12 then subsides, the float 23 of the float-controlled magnetic switch 22 will subside too and when the same is adjacent to the contacts 22' the latter are closed and the relay is energized through leads 84, 102, 101, 100, and 97. The relay then picks up to move its switch to position 92 so that the leads 95 and 96 are disconnected from each other, the pump and the shut-off valve are de-energized, and the purification of liquid is interrupted. To prevent an undesired starting of the apparatus in response to a rise of the liquid level in the antechamber 12, the relay is connected to the source of current through leads 103, 95 and 94 and 100 and 97 when the switch of the relay is in position 92. Hence, the relay does not drop out until the main switch 90 is opened.

FIG. 7 is a perspective view showing an actual embodiment of the apparatus 45. The antechamber 12 is provided with a mounting plate 64 for mounting the apparatus in the bilge 16. The unit 60 consists of a sheet metal box and can be connected to the unit 46 so that the latter is carried by the unit 60. The unit 60 may be mounted at any desired location, e.g., placed on the floor or secured to a rib. To connect the units 60 and 46, a pin 61 provided on the underside of the housing of unit 60 is inserted into an aperture at the bottom of the container 48 of the unit 46 and said container 48 is then locked in position in that a set screw 62 is tightened, which is secured by a strap 63 to the housing of the unit 60. When the set screw 62 has been loosened and the quick couplings 58 have been disconnected, the unit 46 can be removed from the unit 60 and replaced by a new one. The housing of the unit 60 is also provided with plug contacts 104 for connecting the electric leads for controlling the apparatus and for the leads 101 and 102 leading to the float-controlled magnetic switch 22 in the antechamber 12. It is also apparent from FIG. 7 that the conduit 7 extends in part inside the unit 60.

The apparatus 45 is put into operation as follows: The unit 46 is first filled with water through the filling opening 67, the conduit 20, the equalizing chamber 30, the centrifugal pump 21 and the chamber 65. The unit 46 is then secured to the unit 60 and the quick couplings 58 are connected. When the electric leads are then connected to the plug contacts 104, the apparatus 45 is ready for operation. Any air in conduits 7 and 20 will not be disturbing because such air will be collected above the damping layer 49 in the unit 46 or in the chamber 65 of the unit 60 and cannot enter the pump 21. It will be understood that the unit 60 need not be refilled when the filter has been exchanged because the conduits 20 and 7 are connected to the housing of the unit in the upper part thereof so that no water can be drained. The antechamber 12 disposed in the bilge 16 is not filled until the liquid in the bilge exceeds a predetermined level. This arrangement prevents an uneconomical starting of the apparatus when there is only little water in the bilge. On the other hand, the bilge will be pumped out entirely because the inlet pipe 76 is near the bottom of the bilge. When the antechamber 12 is filled and the master switch 90 is operated, the pump will be started and the shut-off valve 71 will be closed so that water which is polluted with oil and the like flows from the bilge through the antechamber 12 and the conduit 7 into the unit 46. As the water flows through the damping layer 49, course impurities are retained and turbulence in the separating chamber 47 is avoided. A coarse separation into an oil layer 13 and a water layer 14 is effected in the separating chamber 47. Water which has a small residual oil content flows out of the unit 46 through the opening 54 in the partition 51, the filter 6 and the conduit 20. The water which has been purified flows off through the chamber 65 and the centrifugal pump 21, the conduit 27, the equalizing chamber 30 and the discharge conduit 31. The rate of flow of the water can be controlled in a simple manner by the throttle valve 32 in the discharge conduit 31. When the bilge 16 has been pumped out entirely, the liquid level in the antechamber 12 will subside and when the liquid has subsided below a predetermined level the magnetic switch 22 will de-energize the pump 21 to interrupt the handling of liquid. Because there is a vacuum over the filter 6, water from the equalizing chamber 30 is sucked back through the pump and the chamber 65 into the unit 46 so that the filter is automatically cleaned and an ingress of an excessive amount of air from the antechamber 12 into the separating chamber 47 is avoided. In this operation, some air from the chamber 65 is entrained so that the air cushion in the latter cannot increase beyond a certain size. The master switch is now opened to de-energize the apparatus, which can be put into operation again when the antechamber 12 has been refilled and the master switch is closed. When the oil layer 13 in the separating chamber 47 fills the latter to the separating wall 51, the valve ball 52 automatically prevents an overflow of oil into the filter 6 so that even when the apparatus is not supervised, oil or the like cannot pass through the filter 6 and over board. When the flow of liquid through the unit 46 is interrupted, a further separation of oil and water is effected and as a result of this separation any water particles enclosed in the oil layer 13 may settle down so that the oil layer is somewhat decreased. A large amount of oil will not enter the filter 6 when the purification of liquid is then resumed.

Figure 8:
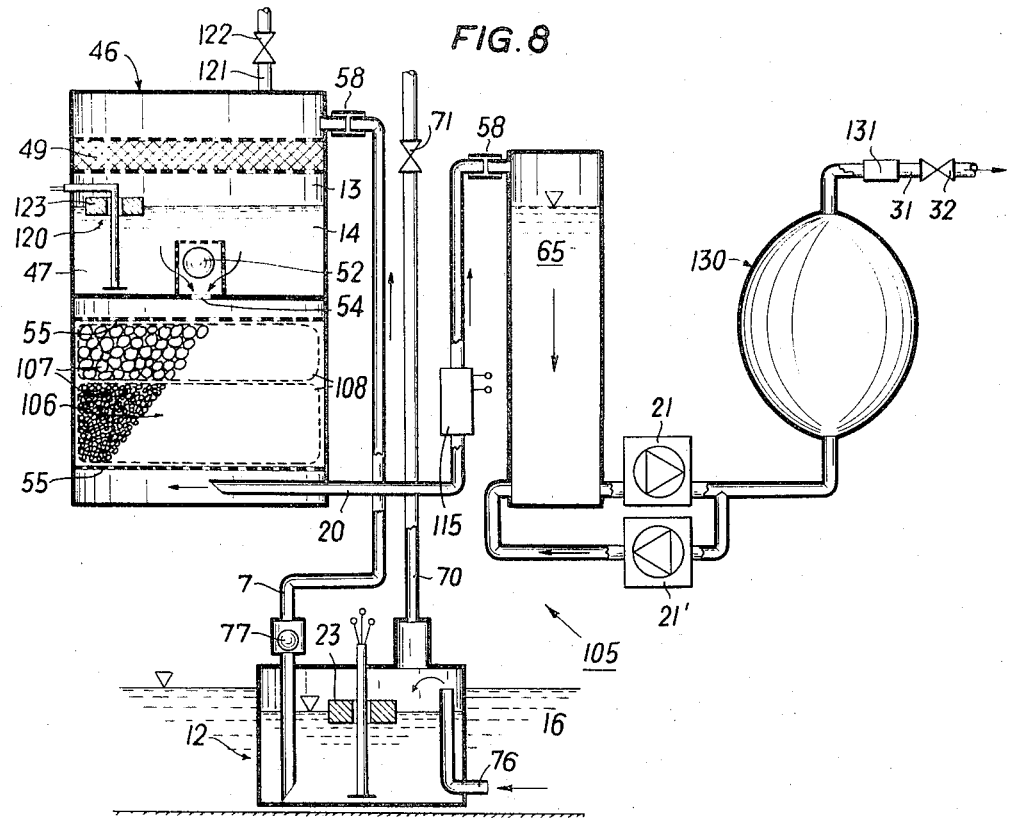
FIG. 8 shows, in vertical section, another embodiment of an apparatus according to the invention.

The apparatus 105 which is diagrammatically shown in FIG. 8 is arranged for a fully automatic operation. The antechamber 12 is designed like that in the apparatus 45 with the exception that the float-controlled magnetic switch is a two-position switch so that the apparatus can be started when the liquid in the antechamber 12 has reached a certain level. The unit 46 is also designed like the unit 46 of the apparatus 45 and is additionally provided with a float-controlled magnetic switch 120 in the separating chamber 47 and an oil drain 121, which is provided with a shut-off valve 122 and controlled by the switch 120. The filter in the unit 46 may be of the kind which has been described in connection with the apparatus 35. Alternatively, as is indicated in FIG. 8, the filter may consist of a filter layer 106 of balls 107. The balls 107 are made, e.g., of polytetrafluoroethylene. The filter layer 106 is also carried between perforated plates 55 and in the embodiment shown by way of example has two layers of balls 107 which differ in diameter. The upstream, upper balls are larger than the lower balls. The filter layer 106 can easily be exchanged if the balls are held in nets 108, as indicated.

A vacuum switch 115 is incorporated in the conduit 20 between the unit 46 and the chamber 65 and de-energizes the pump when the valve ball 52 has interrupted the flow of liquid from the separating chamber 47 through the opening 54 into the filter chamber.

The equalizing chamber may be designed like the equalizing chamber 30 of FIG. 3 and be provided with the vapor lock 66 described in connection therewith. Alternatively, the equalizing chamber may be defined by an expansible body 130, which may be similar to a football bladder. If the equalizing chamber is defined by an expansible body 130, the vapor lock may consist of a simple check valve 131 which opens in the direction in which water is discharged. The check valve may consist, e.g., of a spring-loaded ball valve. When the apparatus has been de-energized and the vacuum upstream of the filter and in the chamber 65 causes water to flow back through the pump 21 into the unit 46, the volume of the container 130 will be decreased. The container will be reexpanded when the purification of water is resumed. When so much oil has been collected in the separating chamber that the latter is entirely filled by the oil layer 13, the densimetric valve ball 52 closes the opening 54 and the discharge of liquid is interrupted. At the same time, the densimetric float 123 has reached the lower contacts of the float-controlled magnetic switch 120 so that the latter causes the valve member 122 in the oil drain 121 to be opened and also de-energizes the pump 21 and energizes another centrifugal pump 21', which discharges in the opposite direction. The centrifugal pump 21' supplies water from the equalizing chamber 130 through the chamber 65 and the filter 106 into the separating chamber 47 so that oil is forced out of the unit 46 through the oil drain. When the interface between the oil layer 13 and the water layer 14 has risen so that the float 123 operates the upper contacts of the float-controlled magnetic switch 120, the pump 21' is de-energized and the pump 21 is energized and the shut-off valve 122 is closed. The normal purification of water is now resumed. Instead of the two centrifugal pumps 21, 21', a reversible pump for handling water in both directions may be connected between the chamber 65 and the equalizing chamber 130.

Figure 9:
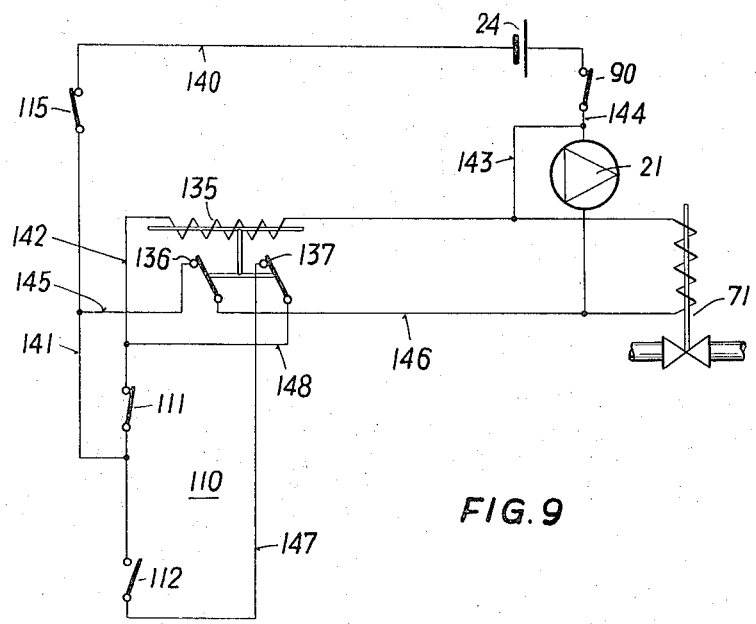
FIG. 9 is a circuit diagram showing the electric components of the apparatus of FIG. 8.

The electric components of the apparatus 105 are shown in FIG. 9. For the sake of clarity, the circuits by which the float-controlled magnetic switch 120 controls a forcing of oil out of the separating chamber 47 have been omitted. The float-controlled magnetic switch 110 in the antechamber 12 has two sets of contacts. The upper contacts close as the float approaches. The lower contacts open as the float approaches. When the master switch is closed and the vacuum switch 115 is also closed during normal operation, current flows from the source of current 24 through leads 140, 141, the contacts 111 of the float-controlled magnetic switch 110, which contacts are closed when the antechamber 12 is filled, the lead 142 and the relay 135 and back through leads 143 and 144 to the source of current 24. The contacts 136 and 137 of the relay are closed when the same is energized so that the pump 21 is energized through leads 140, 145, contacts 136, and leads 146 and 144. At the same time, voltage is applied to the solenoid valve 71, which is connected in parallel to the pump 21 and is then closed. Together with the liquid in the antechamber 12, the float 23 will subside so that the contacts 111 of the float-controlled magnetic switch 110 open. The relay 135 is now energized through the still closed contacts 112 and the lead 147, the switch contact 137 of the relay 135 and the leads 148 and 142 so that the contacts 136 of the relay 135 remain closed and the pump 21 continues to operate. Only when the float 23 reaches the lower contacts 112 of the float-controlled magnetic switch 110 are these contacts opened and the relay 135 drops out and the motor of the pump 21 and the solenoid of the solenoid valve 71 are deenergized. When the liquid level in the antechamber 12 rises again until the float 23 has reached the upper contacts of the float-controlled magnetic switch 110, the contacts 111 are closed and the operation of the apparatus is automatically resumed.

FIG. 10 shows by way of example an embodiment of the vacuum switch 115 which is incorporated in the conduit 20 between unit 46 and chamber 65. A diaphragm 117 divides the housing 116 of the vacuum switch 115 into two chambers 118 and 119. The chamber 118 communicates with the connecting conduit 20. The chamber 119 communicates with the outside atmosphere. The diaphragm 117 carries at its center a contact 125. A second contact 126 is displaceably mounted in the housing 116. The extent of the displacement may be set by a screw 127. In response to a vacuum in the conduit 20 and chamber 118, the diaphragm 117 is deflected. A spring 128 holds the contact 126 against the contact 125 until the screw 127 engages a stop 129, which is fixed to the housing. In response to a higher vacuum in the conduit 20, the contacts open to de-energize the pump 21 so that the apparatus 105 is shut down. In response to a pressure rise in conduit 20, the contacts 125 and 126 are closed again so that the purification of water is resumed.

An embodiment of the float-controlled magnetic switch 110 diagrammatically indicated in FIG. 11 and used in the apparatus 105 will now be described more in detail and by way of example. The float-controlled magnetic switch 110 has a housing 114, into which the leads 141, 142, and 147 liquid-tightly extend. The housing 114 contains two hollow glass capsules, which are filled with inert gas. The contacts 111 of the float-controlled magnetic switch are fused in the upper glass capsule 116 and close in response to the approach of the float 23 and of the annular magnet 113. The contacts 111 are open when the float 23 is in the position shown. The lower contacts 112 are fused in the lower glass capsule 117 and are closed when the float 23 is in the position shown in FIG. 11 and open only in response to the approach of the annular magnet 113.

Finally, it may be noted that the apparatus 105 diagrammatically shown in FIG. 8 may be analogous to the apparatus 45 of FIG. 7 in its external design and may be composed of analogous units.

Oil-polluted water was purified with the apparatus 45 shown in FIGS. 3, 4, 6, and 7. The feed samples had the compositions stated in Table I:

Table I

| Sample 1 | 25% SAE 30 oil | 75% fresh water |
| Sample 2 | 25% SAE 30 oil | 75% salt water |
| Sample 3 | 25% Diesel oil | 75% salt water |
| Sample 4 | 25% Diesel oil | 75% fresh water |
| Sample 5 | 25% Diesel oil | 75% fresh water |

The oil content of the water samples which had passed through the apparatus was determined by an infrared-spectroscopic method by which the C-H valence vibrations of the oil were investigated. By means of respective calibration curves for the SAE 30 oil and the Diesel oil, bands at 2950, 2920 and 2850 cm$^{-1}$ were detected. The contents of SAE 30 oil and Diesel oil stated in Table II were ascertained:

Table II

| | Type of oil | Water | Content (mg oil per liter of water) |
|---|---|---|---|
| Sample 1 | SAE 30 | fresh water | 2.0 |
| Sample 2 | SAE 30 | salt water | 0.3 |
| Sample 3 | Diesel oil | salt water | 0.7 |
| Sample 4 | Diesel oil | fresh water | 0.7 |
| Sample 5 | Diesel oil | fresh water | 0.9 |

The filter which was used consisted of an open-pored plastic material foam of cross-linked polyurethane having a specific gravity of 35 kilograms per cubic meter. The filter was 180 millimeters in diameter and had a height of 125 millimeters. The velocity of flow through the filter was 2.1 liters per minute for samples 1 and 2 polluted with SAE 30 oil and 2.8 liters per minute for samples 3, 4, and 5 polluted with Diesel oil.

What we claim is:

1. A process of purifying a polluted liquid which contains a liquid impurity having a lower specific gravity than the polluted liquid, which process comprises
   intermittently sucking said polluted liquid from an antechamber into a filter through a separating chamber,
   intermittently sucking filtered liquid from said filter and discharging said filtered liquid under pressure through an equalizing chamber,
   controlling the intermittent sucking and discharge of said liquid in dependence on the liquid level in said antechamber; and subjecting said liquid in said separating chamber to to a preseparation to remove a major portion of said liquid impurity.

2. A process as set forth in claim 1, which is used to purify oil-polluted water.

3. A process as set forth in claim 1, in which
   said preseparation results in the formation of a layer of said liquid impurity in said separating chamber and
   the flow of liquid from said separating chamber to said filter is interrupted when said layer has reached a predetermined thickness.

4. A process as set forth in claim 3, in which the sucking of polluted liquid from said antechamber is interrupted when the flow of liquid from said separating chamber is interrupted.

5. In a separating apparatus for separating two liquids of different specific gravity of a liquid mixture and comprising housing means defining an antechamber and a filter chamber downstream of the antechamber, and float means for controlling the transfer of liquid from the antechamber to the filter chamber and the intake of the liquid mixture to be separated, the improvement wherein the antechamber is provided with a magnetic float switch and an equalizing chamber is provided downstream of the filter chamber, conduit means is provided to interconnect the filter chamber and the equalizing chamber and includes a pump controlled by said switch and having a suction side connected to said filter chamber and a discharge side opening into said equalizing chamber, at least two of said chambers being provided in vertically superimposed relation in said housing means.

6. The improvement defined in claim 5 wherein a separating chamber is interposed between said antechamber and said filter chamber and is connected therewith through a flow valve with a densimetric float lying beneath the boundary between said liquids and said separating chamber.

7. The improvement defined in claim 5 wherein said housing means has a cover disposed above said antechamber for forming said equalizing chamber.

8. The improvement defined in claim 5 wherein said conduit means and said pump are disposed within said housing means and are carried by a cover thereof, said magnetic switch being likewise carried by said cover.

9. The improvement defined in claim 5 further comprising means for automatically venting said antechamber upon standstill of the apparatus.

10. Apparatus for purifying a polluted liquid which contains a liquid impurity having a lower specific gravity than said polluted liquid, which apparatus comprises antechamber means defining an antechamber adapted to hold said polluted liquid,
a filter connected to said antechamber,
an equalizing chamber,
liquid-handling means connected between said filter and said equalizing chamber and intermittently operable in a forward direction to suck polluted liquid from said antechamber into said filter, to suck filtered liquid from said filter and to discharge said filtered liquid under pressure through said equalizing chamber, and
control means for controlling the operation of said liquid-handling means in dependence on the liquid level in said antechamber, said liquid-handling means comprising a pump having a suction side connected to said filter and a discharge side connected to said filter and a discharge side connected to said equalizing chamber, and
said control means comprising a switch which is disposed in said antechamber and arranged to control said pump in dependence on the liquid level in said antechamber, said filter being preceded by a separating chamber and being arranged to be flown through by the liquid from the separating chamber from top to bottom, said antechamber means being formed in a housing which also contains said filter, said equalizing chamber being disposed above said separating chamber.

11. Apparatus as set forth in claim 6, in which said switch is a float-controlled magnetic switch arranged to deenergize said pump when the liquid in said antechamber subsides below a predetermined level.

12. Apparatus as set forth in claim 10, in which said housing has a cover which contains said equalizing chamber.

13. Apparatus as set forth in claim 10, in which the volume of said equalizing chamber is at least as large as the volume of said antechamber.

14. Apparatus as set forth in claim 10, which comprises
an intake conduit having an inlet end adapted to be disposed in a body of polluted liquid outside said antechamber and having an outlet end disposed in said antechamber,
a check valve incorporated in said intake conduit, and
a float-controlled shut-off valve adapted to close said inlet end.

15. Apparatus as set forth in claim 10, in which
said pump is accommodated in said housing, and
said housing has a cover which carries said switch, said pump, and a conduit from said pump to said equalizing chamber whereas said filter is carried independently of said cover.

16. Apparatus as set forth in claim 15, in which said cover carries also an intake conduit for supplying polluted liquid to said antechamber.

17. Apparatus as set forth in claim 15, in which said control means comprise electric leads carried by said cover.

18. Apparatus as set forth in claim 10, which comprises
a first unit comprising said antechamber means,
a second unit comprising said filter and said separating chamber, and
a third unit comprising said pump and said equalizing chamber.

19. Apparatus as set forth in claim 18, in which said second unit is detachably connected to and carried by said third unit.

20. Apparatus as set forth in claim 18, in which
connecting conduits are provided which connect said first unit to said second unit and said second unit to said third unit,
said connecting conduits are provided with quick couplings, and
means are provided which define an air-collecting chamber which is connected between said filter and said pump and serves to collect air contained in said connecting conduits.

21. Apparatus as set forth in claim 18, which comprises
an air supply conduit which is connected to said antechamber and
valve means for closing said air supply conduit when said liquid-handling means are in operation and for opening said air supply conduit when said liquid-handling means are inoperative.

22. Apparatus as set forth in claim 21, in which said valve means comprise a solenoid valve.

23. Apparatus as set forth in claim 21, in which said valve means are adapted to be closed in response to a vacuum between said filter and said pump.

24. Apparatus as set forth in claim 18, in which
said antechamber means comprise means defining the top of said antechamber,
a supply chamber having a bottom and adapted to hold polluted liquid is associated with said antechamber, and
an intake conduit for supplying polluted liquid to said antechamber has an inlet disposed outside said antechamber in said supply chamber near said bottom and an outlet disposed in said antechamber near said top.

25. Apparatus as set forth in claim 18, in which said switch is a float-controlled magnetic switch arranged to energize said pump when the liquid in said antechamber rises above a predetermined level.

26. Apparatus as set forth in claim 18, which comprises
a connecting conduit connecting said antechamber and said separating chamber and
a check valve incorporated in said connecting conduit.

27. Apparatus as set forth in claim 18, in which said equalizing chamber has a liquid discharge opening provided with a vapor lock.

28. Apparatus as set forth in claim 27, in which
said vapor lock comprises means defining a chamber, which is connected to said equalizing chamber by a first check valve opening in the direction in which liquid is discharged and a second check valve opening opposite to the direction in which liquid is discharged, and
a liquid discharge conduit is connected to said chamber.

29. Apparatus as set forth in claim 18, in which
said equalizing chamber means consist of an expansible hollow body having a liquid discharge opening and a check valve opening in the direction in which liquid is discharged from said opening is adapted to close the latter.

30. Apparatus as set forth in claim 18, in which
said filter is retained between spaced apart upper and lower, perforated plates and
said upper perforated plate is formed with perforations which decrease in size toward the center of said plate.

31. Apparatus as set forth in claim 18, in which
said filter is retained between spaced apart upper and lower perforated plates and
said upper perforated plate is formed with perforations which increase in pitch toward the center of said plate.

32. Apparatus as set forth in claim 18, in which
said filter is contained in a container having a bottom and
a connecting conduit connects said filter container and said pump and has an opening approximately at the center of said bottom.

33. Apparatus as set forth in claim 18, in which
said separating chamber is adapted to separate said polluted liquid into a liquid impurity layer and a prepurified polluted liquid layer,
said separating chamber is provided with a liquid impurity drain adapted to withdraw liquid impurity from said liquid impurity layer,
drain valve means are provided which are operable to open and close said drain,
said liquid-handling means are operable in a reverse direction to force liquid from said equalizing chamber through said filter into said separating chamber,
said separating chamber contains a float-controlled magnetic switch adapted to assume a first position when said liquid impurity layer has a predetermined, relatively large thickness and a second position when said liquid impurity layer has a predetermined smaller thickness, and
said magnetic switch is arranged in said first position to open said drain valve means and to initiate the operation of said liquid-handling means in said reverse direction until said magnetic switch has reached said second position, and in said second position to close said drain valve means and to initiate the intermittent operation of said liquid-handling means in said forward direction.

34. Apparatus as set forth in claim 9, in which
said separating chamber has an upper portion containing two vertically spaced apart, perforated plates,
and a layer of coarse-pored foamed material for reducing turbulence is disposed between and carried by said perforated plates.

* * * * *